Figure 1:
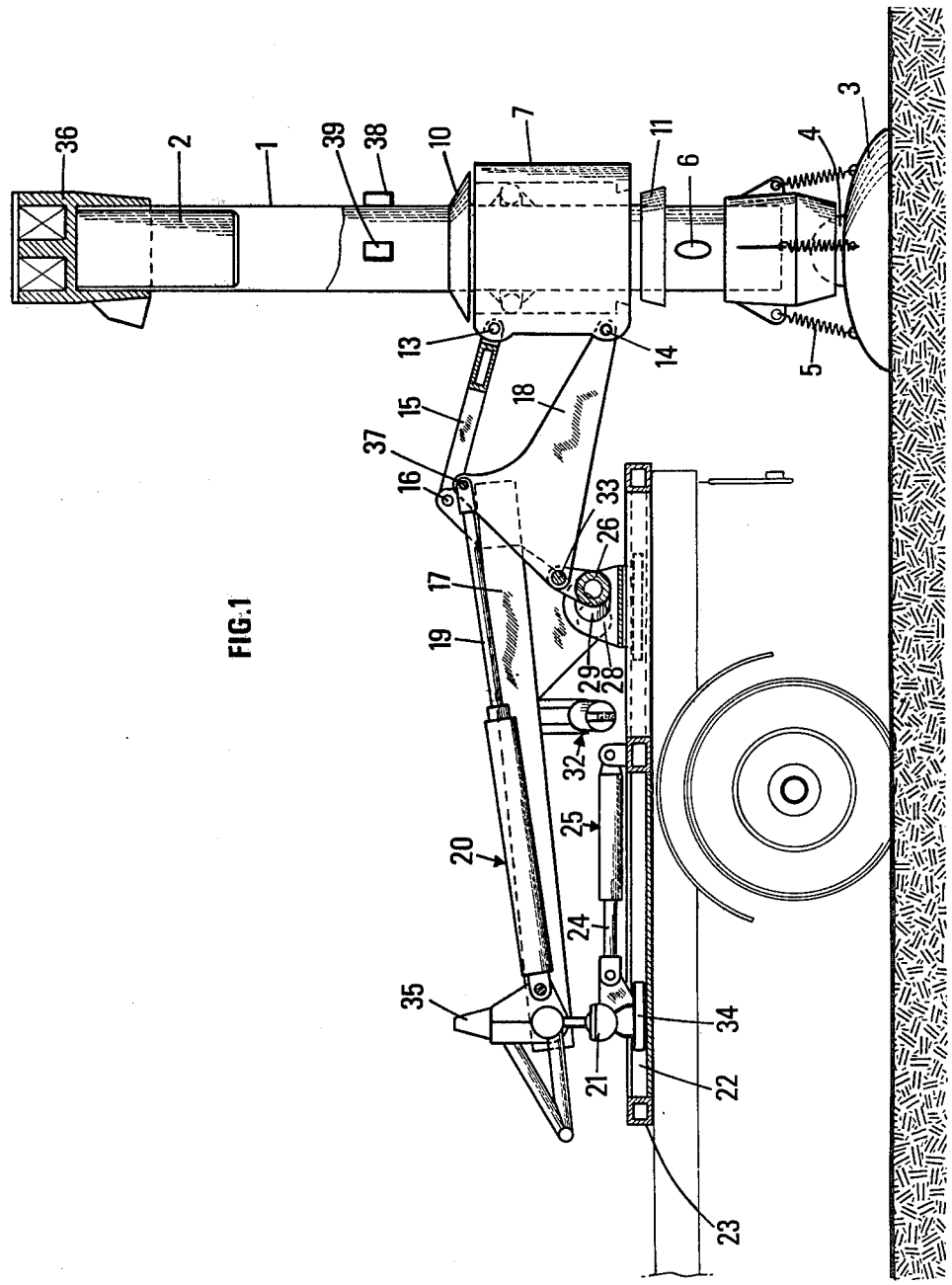

United States Patent [19]

Cholet et al.

[11] 4,205,731
[45] Jun. 3, 1980

[54] DEVICE FOR GENERATING SEISMIC WAVES BY STRIKING A MASS AGAINST A TARGET MEMBER

[75] Inventors: Jacques Cholet, L'Etang-la-Ville; André Pauc, Villennes sur Seine, both of France

[73] Assignees: Institut Francais du Petrole, Rueil-Malmaison; Compagnie Generale de Geophysique, Massy, both of France

[21] Appl. No.: 926,166

[22] Filed: Jul. 19, 1978

[30] Foreign Application Priority Data

Jul. 20, 1977 [FR] France .................... 77 22489

[51] Int. Cl.² .................................. G01V 1/04
[52] U.S. Cl. ........................ 181/114; 181/121
[58] Field of Search .................. 181/114, 121; 173/90–92, 128

[56] References Cited

U.S. PATENT DOCUMENTS

| | | | |
|---|---|---|---|
| 3,209,854 | 10/1965 | Williams | 181/121 |
| 3,318,411 | 5/1967 | Doubt | 181/121 |
| 3,393,763 | 7/1968 | Sundt | 181/114 |
| 3,542,151 | 11/1970 | Hamilton | 181/121 |
| 4,064,964 | 12/1977 | Norden | 181/121 |
| 4,118,994 | 10/1978 | Layotte et al. | 181/121 |

FOREIGN PATENT DOCUMENTS 612569 4/1935 Fed. Rep. of Germany ........... 181/121

Primary Examiner—Howard A. Birmiel
Attorney, Agent, or Firm—Millen & White

[57] ABSTRACT

A device for generating acoustic waves in the earth by striking a mass, housed in a guiding tube, against a target member secured to the lower end of this tube and coupled to the earth in operating conditions, including means, such as an electromagnet, for holding said mass at the upper end of said tube and releasing it at will, and means to turn the tube upside down after each operation so as to reset the mass in position for a new operation.

22 Claims, 6 Drawing Figures

DEVICE FOR GENERATING SEISMIC WAVES BY STRIKING A MASS AGAINST A TARGET MEMBER

This invention relates to a device for generating seismic waves in the earth by striking a mass against a target member. It concerns more particularly a device for generating seismic waves by striking a mass, previously lifted to a certain height above a target member, in contact with the earth, against said target member.

Known devices, used more particularly in seismic prospecting, comprise essentially a mass, a target member coupled with the earth, a system for guiding the fall of the mass towards the target member and removable elements for holding the mass in upper position. They further comprise means for hoisting the mass to its upper position so as to reset the device after each releasing and a lifting system, fixed on a vehicle, for moving the device from a position of use where the target member is in contact with the earth to a position of transportation and vice-versa.

The prior devices require two separate systems, one of them being used for lifting the mass, and the other for moving the whole device with respect to the carrying vehicle.

The device of the present invention comprises an elongate member for guiding the mass during its displacement, the target member being secured at a first end of said guiding member and means for intermittently retaining the mass, said means being secured to the guiding member at the vicinity of its second end.

The device is remarkable in that it comprises means for displacing the guiding member from a first position where the mass can move, by gravitation effect, from the second end of the guiding member towards the target member secured at its first end, said target member being coupled to the earth in said first position, to a second position where the mass moves by gravitation effect from the first end to the other end of the guiding member where are secured the retaining means.

The displacement means comprise, for example, a system rigidly secured to a support, for rotating the guiding member from the first position to the second position at which the first end to which is secured the target member is at a higher level than the second end.

Since the second position is preferably the position adapted for the transportation of the guiding member, it is unnecessary to make use, as in the prior devices, of two separate systems for handling respectively the mass and the guiding member.

These two operations may be performed by the displacement means of the guiding member which have the double function of transferring the mass towards the end opposite the target member and of displacing the device from a working position to a transportation position.

Figure 2:
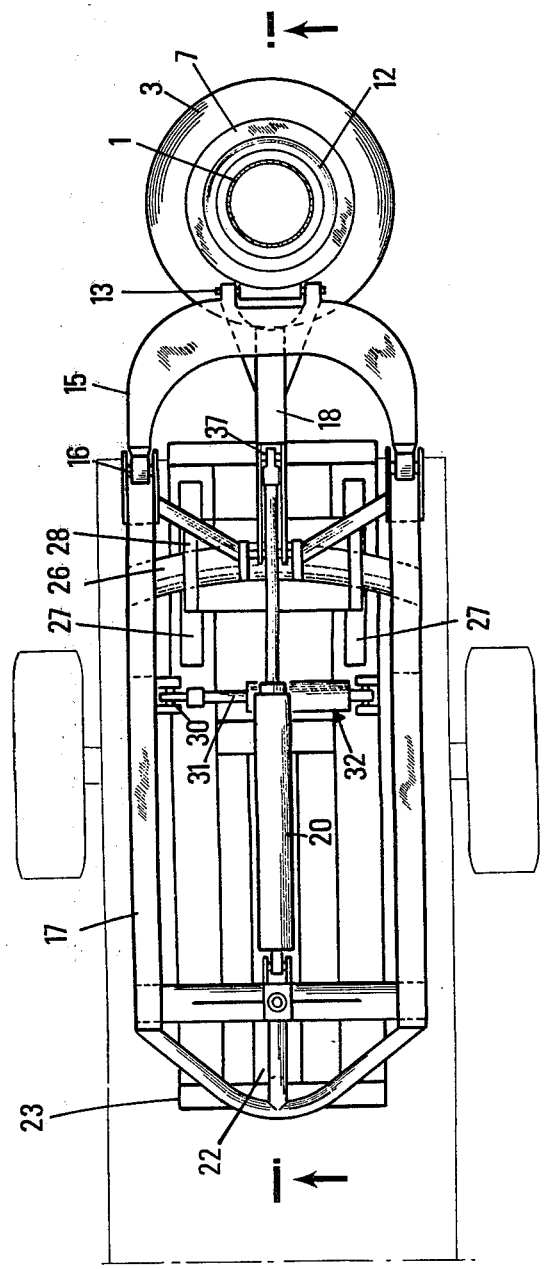
Figure 3:
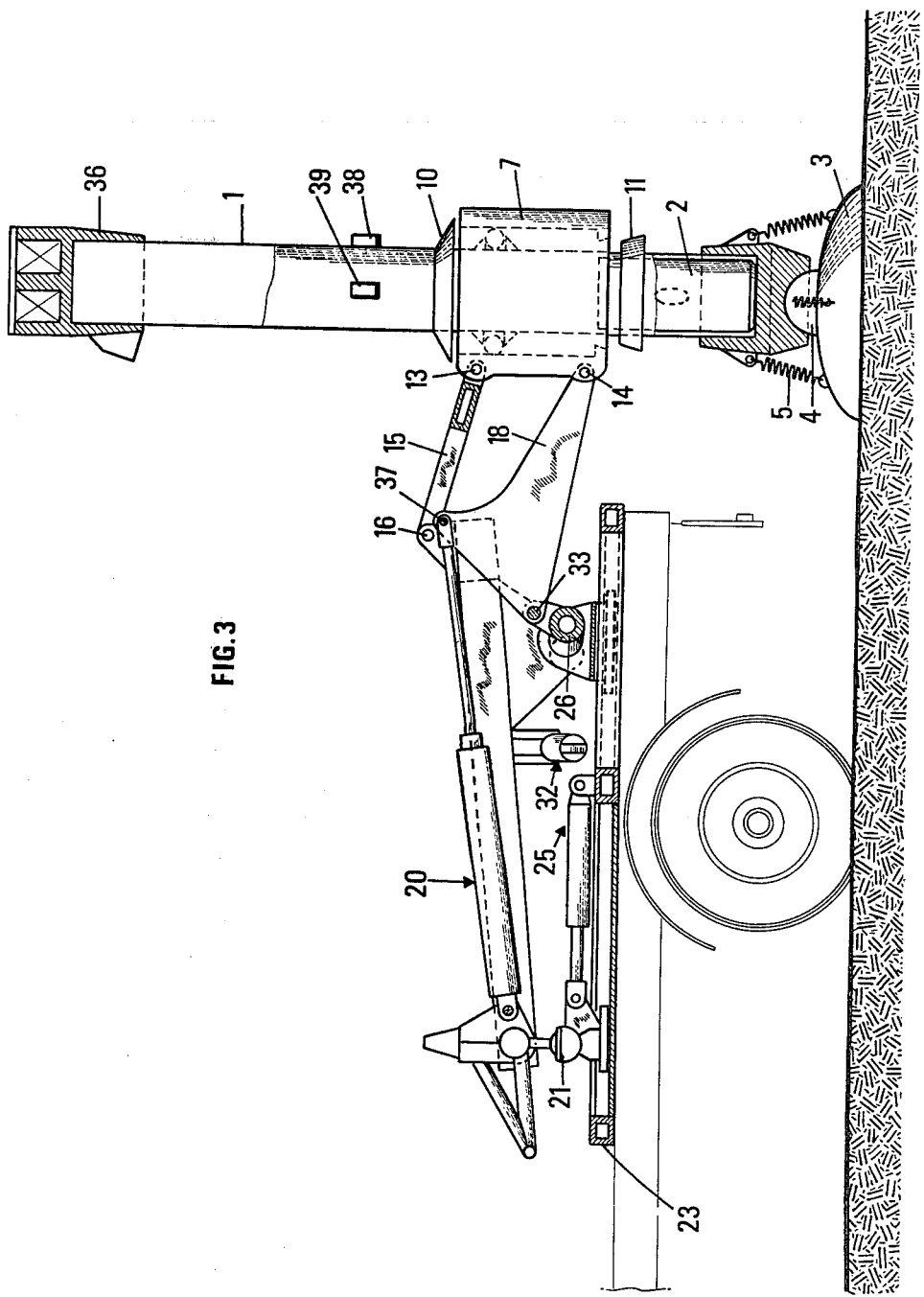
Figure 4:
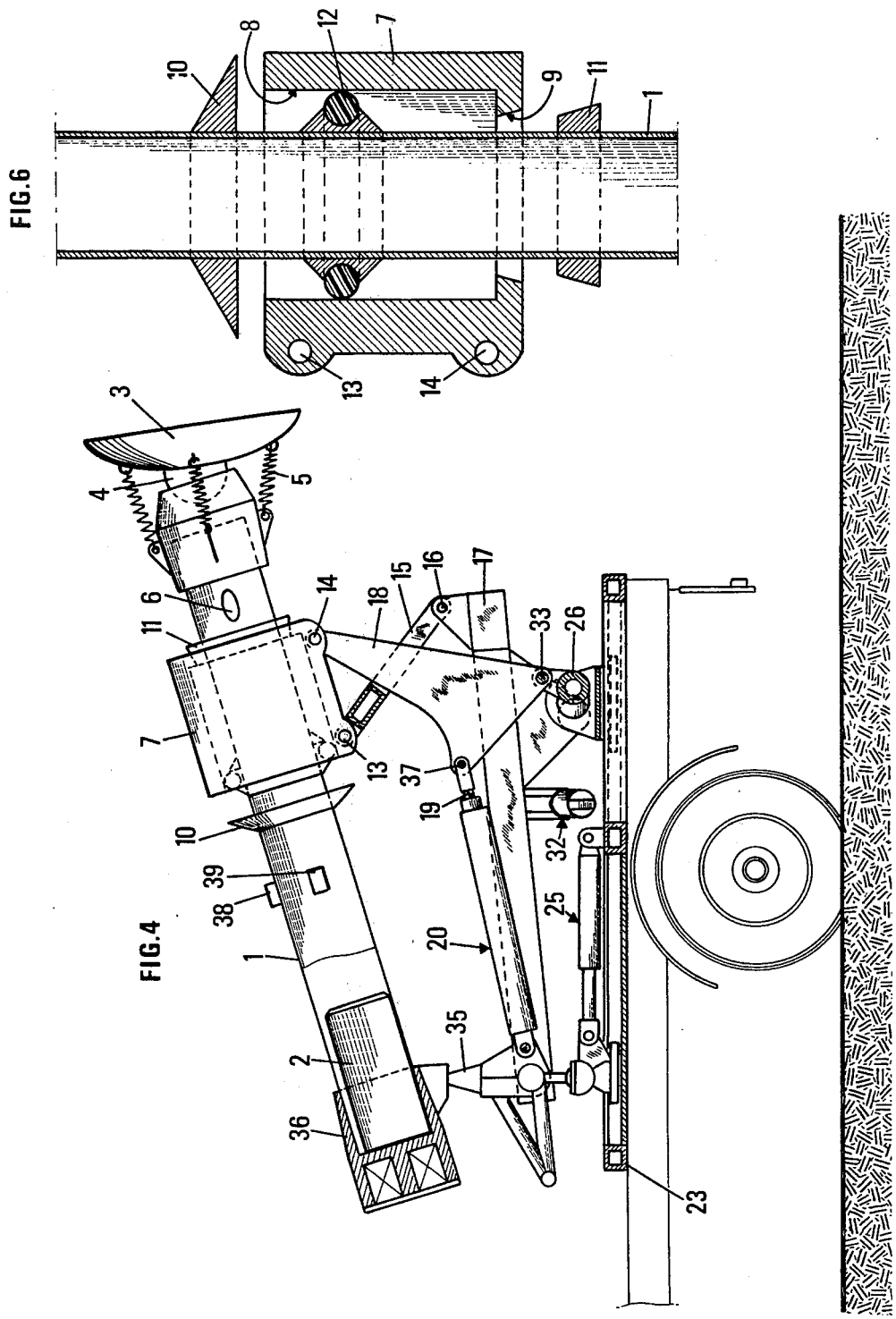
Figure 5:
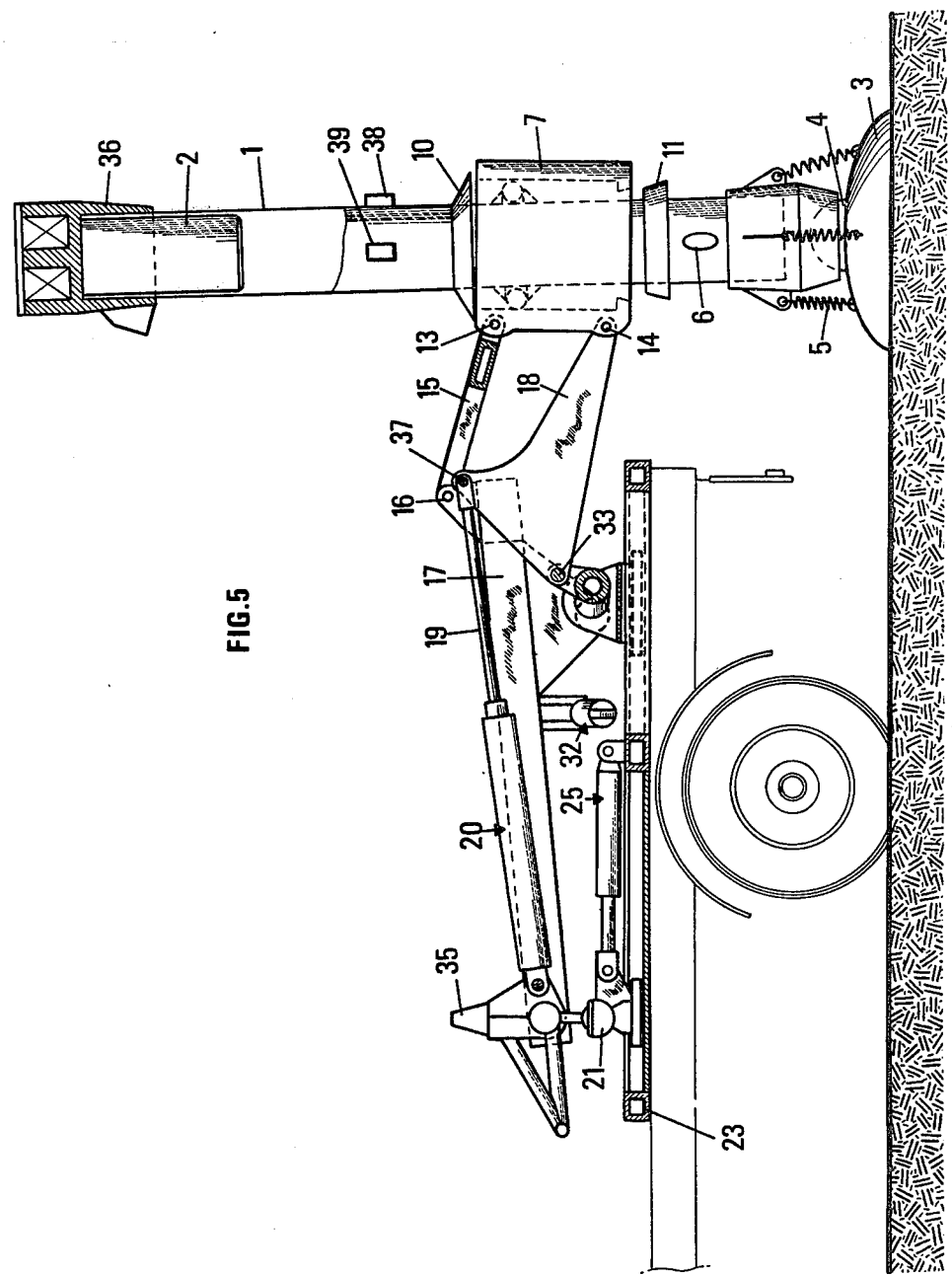

Other peculiar features and advantages of the device will be made apparent from a particular embodiment thereof, selected as example, with reference to the accompanying drawings wherein:

FIG. 1 diagrammatically shows a general view of the device with the guiding member in the first position, the mass being retained at the second end of said member through retaining means;

FIG. 2 is a view from above of the device of FIG. 1;

FIG. 3 diagrammatically shows a general view of the device with the guiding member in the first position, the mass being in contact with the target member after release thereof;

FIG. 4 diagrammatically shows a general view of the device with the guiding member in the second position;

FIG. 5 diagrammatically shows a general view of the device on a sloping ground, the guiding member being in the first position and oriented vertically, and FIG. 6 diagrammatically shows a detail view of the system for pivoting the guiding member.

In FIGS. 1 to 5, the guiding member is shown as formed by a guiding tube 1 in which may slide, with a certain play, a mass 2 at least a portion of which is made of metal.

A first end of the guiding tube 1 is secured to a target member 3 through a fastening system, preferably articulated. This fastening system may comprise a ball-and-socket joint 4, the ball portion of which is integral with the target member and may pivot in a housing provided in the end portion of tube 1. Springs 5 are adapted to secure the target member 3 to the end portion of the guiding tube 1. At the other end of the guiding tube 1, are secured means 36 for intermittently retaining the mass 2 comprising, for example, an electro-magnet. An orifice 6 through the wall of the guiding tube 1, establishes the communication between the lower part thereof and the external medium and provides for the free exhaust of the air pushed by the fall of the mass towards the target member.

The guiding tube 1 is held by means of a tubular sleeve 7 (FIG. 6) defining a cylindrical inner space of a diameter larger than that of the tube and provided, at its lower part, with a slightly conical hole.

The guiding tube 1 comprises two protrusions 10 and 11 arranged respectively on both sides of the tubular sleeve 7 and spaced apart at a distance greater than the height thereof. The protrusion 11 has a shape adapted to that of the conical hole 9. A ring 12 of rubber or plastic material is secured to the lateral wall of the guiding tube 1 and has a diameter substantially equal to that of the inner cavity 8 of the tubular sleeve 7. The ring 12 is used for centering the guiding tube inside the sleeve. Within the limit of the space left free by the conical hole 9, the guiding tube 1 may pivot inside the tubular sleeve 7 so as to be kept vertical when the latter has an inclination in either direction with respect to the shown position.

The tubular sleeve 7 is provided with holes housing two axles 13 and 14 (FIGS. 1 to 5). A U-shaped supporting arm 15 (shown particularly in FIG. 2) is articulated on axle 13.

The two legs of arm 15 may pivot at their ends about axles 16, secured to lateral beams of a first elongate support or rigid frame 17. An axle 14 is articulated a second supporting arm 18 consisting, for example, of a substantially triangular plate. One of the apices of plate 18 is secured to an axle 37 about which may pivot the end of rod 19 or a jack 20 whose body is connected to the rigid elongate support 17 at the vicinity of one of its ends.

At this very end, the rigid support 17 is integral with the ball portion of the ball-and-socket joint 21, whose socket portion is integral with a movable member or slider 34 adapted to be moved in a guide rail 22 secured to a rigid frame 23 laying for example on the base frame of a vehicle such as a truck. The rigid frame 23 may also be provided with legs and be laid on the ground at convenient locations. In that case, it may be displaced by helicopter or by any other vehicle. The guide rail 22 is substantially oriented along the longitudinal axis of the vehicle. To the movable piece 34 is secured the end of the rod 24 of a jack 25 whose body is articulated through an axle to the second frame 23, supported by the base frame of the vehicle.

Close to its other end, the rigid support 17 is secured to an elongate element of curved tubular support 26, rigid in translation whose curvature center is substantially at the ball-and-socket joint 21. On both sides of the longitudinal axis of the vehicle, parallelly thereto and integral with frame 23, are arranged two guide rails 27, inside which two movable support members or sliders 28 are adapted to slide.

The two support members 28 comprise orifices or ports 29 for the passage of the tubular support 26.

The rigid support 17 comprises (FIG. 2) an articulation axle 30 for the rod 31 of a transversally oriented jack 32, whose body is articulated through an axle to the frame 23 supported by the base frame of the vehicle. The third apex of the supporting plate 18 is adapted to pivot about an axle 33 rigidly secured to the tubular support 26.

The three jacks 20, 25 and 32 are fed through a hydraulic system not shown.

The device further comprises means for controlling the verticality of the guiding tube in "shot" position. These means comprise two verticality sensors 38, 39 arranged on the guiding tube 1, whose axes are respectively perpendicular to the hydraulic jacks 25 and 32. Each sensor consists for example of an electro-magnetic pendulum of a known type. The verticality sensors co-operate with an electronic device adapted to control two electro-valves which respectively actuate the hydraulic jacks 25 and 32 until the guiding tube 1 be vertical. The means for controlling the verticality of the tube, co-operating with the sensors, are not shown.

There is advantageously used a mass 2 whose weight is from 0.5 to 1.5 times the weight of the target member and preferably close to said weight. The target-member is of a kind so selected that its acoustic impedence be substantially adapted to that of the earth. It is made for example of cement poured into a metal casing.

When the jack 25 is actuated, the movable member 34 is displaced in the guide rail and drives in motion the whole rigid support 17, and therewith the movable support members 28 which slide into the two guide rails 27, and the articulation axles of the supporting arms 15 and 18. As a result, the sleeve 7 of the guide tube 1 is displaced parallelly to itself along a direction parallel to the longitudinal axis of the vehicle. When the jack 32 is actuated (FIG. 2), the rigid support 17 pivots about the ball-and-socket joint 21 and is guided in its movement by the displacement of the tubular support 26 through the ports 29 of the two supporting members 28. It also results that the sleeve 7 of the guiding tube is displaced along an arc of a circle having its center at the ball-and-socket joint 21, in a transverse direction with respect to the vehicle. The simultaneous actuation of both jacks 25 and 32 have the effect of displacing the sleeve 7 of the guiding tube in a plane parallel to frame 23 laying on the vehicle and, as described below, it permits to bring the guiding tube 1 to a vertical position.

For a determined position of the rods of jacks 25 and 32, the sliding movement of the rod 19 of jack 20 has for effect to pivot the assembly of both arms 15 and 18 about their rotation axes 16 and 33 and, consequently, to displace the guiding member 1 from the first position, preferably substantially vertical (FIGS. 1, 3, 5), to the second position (FIG. 4) where the end provided with the electro-magnet 4 is at a lower level than the other end. The rigid support 17 further comprises a bearing surface 35 close to the ball-and-socket joint 21 where the end of the guiding tube takes its bearing in the second position which is also the transportation position of the device.

The operation of the device is as follows:

Once the vehicle has been placed at the desired location for a seismic "shot", in the position shown in FIG. 4, the electromagnet 4 is actuated for holding in position the mass 2 at the end of the guiding member opposite the target member. The main jack 20 is actuated to rotate the guiding member of tube 1 to a substantially vertical position (FIG. 1). Since the guiding tube 1 is liable to be displaced with respect to the sleeve 7, it may take a vertical equilibrium position. However when, at the moment where the target comes in contact with the earth, the guiding tube is not perfectly vertical, it can be placed vertically above the target member by actuation of jack 25 and/or jack 32. These operations may be performed manually or may advantageously be coordinated in an automatic manner by using the means for controlling the verticality, as above defined.

The device according to the invention is also well adapted to handle the guiding tube in the case of a sloping ground at the selected location (FIG. 5). The moving freedom of the guide tube with respect to the sleeve makes it possible to bring it, at equilibrium, along a vertical. In any case, the actuation of jacks 25 and 32 contributes to reset the guide tube to vertical position when deviations have been observed.

Once the guiding tube 1 has been placed, the target member being in contact with the ground, the fall of the mass 2 to strike the target member 3 (FIG. 3), is initiated. When another "shot" must be performed, the main jack 20 is actuated for rotating the guide tube 1 from the first position where the target member 3 is in contact with the ground to a second position where the target member is at a level higher than the end provided with the electro-magnet. The mass falls towards this end by gravitation effect and may be again held in position by energizing the electro-magnet (FIG. 4).

What we claim is:

1. In a device for generating acoustic waves in the earth by striking a mass against a target member, comprising an elongate guiding member for guiding the displacement of said mass, a target member secured to the first end of said guiding member, means for intermittently retaining said mass, said means being secured to said guiding member in the vicinity of the second end thereof, the improvement comprising a system, secured to a rigid support, for rotating said guiding member from a first position, wherein said mass can move by gravity from the second end of said guiding member towards said target member, said target member being coupled to the earth in said first position, to a second position wherein the first end of said guiding member is at a higher level than the second end thereof, thereby moving said mass by gravity from the first end to the second end of said guiding member, wherein said mass is engaged by said means for intermittently retaining said mass, said system for rotating said guiding member comprising a first support arm having two ends, one end thereof connected to said guiding member and the other end thereof adapted to rotate about a pivot axis, and a second support arm having two ends, one end thereof connected to said guiding member and the other end thereof being adapted to pivot with respect to said rigid support and a first hydraulic jack to pivot said second support arm.

2. A device according to claim 1, wherein said guiding member is orientable, to a substantially vertical direction, with respect to said target member when the latter is coupled with the earth.

3. A device according to claim 1, wherein said guiding member comprises a tube inside which said mass is guided, said tube comprising at least one orifice, close to its first end, through which the inside of said tube communicates with the medium external to said guiding member.

4. A device according to claim 3, wherein said system for rotating said guiding member comprises a sleeve connected to said rigid support through at least one pivotable supporting arm and means for rotating said at least one supporting arm, said tube being held by said sleeve and being displaceable inside said sleeve.

5. A device according to claim 1, wherein said means for intermittently retaining said mass comprises an electro-magnet.

6. A device according to claim 1, wherein said first hydraulic jack comprises a rod connected to said second support arm and a jack body connected to said rigid support.

7. A device according to claim 6, wherein said system for rotating said guiding member comprises a rigid frame and said rigid support is displaceable with respect to said rigid frame.

8. A device according to claim 7, wherein said rigid frame is movable.

9. A device according to claim 6, wherein said system for rotating said guiding member comprises a rigid frame and said rigid support lies on supporting means slidably mounted in guide rails integral with said rigid frame.

10. A device according to claim 9, mounted on a vehicle, wherein said supporting means is placed along the longitudinal axis of said vehicle, said supporting means comprises an elongate member, rigid in translation, with two movable members, displaceable in said guide rails, said elongate member being adapted to be transversely displaceable with respect to said two movable members, and means for transversely displacing said elongate member.

11. A device according to claim 10, wherein said supporting means further comprises a third movable member displaceable with respect to said vehicle along a direction parallel to the longitudinal axis of said vehicle, said device further comprising translation means for displacing said third movable member.

12. A device according to claim 11, wherein said rigid support is connected to said third movable member through a ball-and-socket joint.

13. A device according to claim 10, further comprising means for detecting deviations of the direction of said guiding member with respect to a vertical line and control means co-operating with said means for detecting deviations for resetting said guiding member to a vertical position when said deviations are detected.

14. A device according to claim 13, wherein said means for transversely displacing said elongate member and said two movable members comprises a second and a third hydraulic jacks and said control means comprises valves for intermittently establishing the communication of said second and said third hydraulic jacks with a source of pressurized fluid, and a control system co-operating with said means for detecting deviations, for actuating said valves.

15. A device according to claim 14, wherein said means for detecting deviations comprises at least one electro-magnetic pendulum.

16. A device according to claim 9, wherein said rigid frame is movable.

17. A device according to claim 1, wherein the weight of said mass is from 0.5 to 1.5 times the weight of the target member.

18. A device according to claim 1, wherein the weight of said target member is substantially equal to that of said mass.

19. A device according to claim 1, wherein said target member is made of a material whose acoustic impedance is substantially similar to that of the earth.

20. A device according to claim 1, wherein
(a) the weight of said mass is 0.5 to 1.5 times the weight of said target member;
(b) said guiding member is orientable to a substantially vertical direction with respect to said target member when said target member is coupled with the earth;
(c) said system for rotating said guiding member comprises a rigid frame and said rigid support lies on supporting means slidably mounted in guide rails integral with said rigid frame;
(d) said system for rotating said guiding member further comprising at least one support arm connected to said guiding member and to said rigid support and means for rotating said support arm about a pivot axis and means for rotating said rigid support in a plane substantially parallel to the earth.

21. A device according to claim 1, wherein said target member comprises an anvil coupled with the earth, said target member being secured to said first end of said guiding member by relatively flexible means allowing relative movement of the anvil with respect to said guiding member.

22. A device according to claim 1 wherein said pivot axis, about which said other end of said first support arm is adapted to rotate, operatively connects said first support arm to said elongate guiding member.

* * * * *